US009906176B2

(12) United States Patent
Desabhatla

(10) Patent No.: US 9,906,176 B2
(45) Date of Patent: Feb. 27, 2018

(54) DYNAMIC CALCULATION AND CONTROL OF SYNCHRONOUS MACHINES

(71) Applicant: General Electric Company, Schenectady, NY (US)

(72) Inventor: Sreedhar Desabhatla, Munich (DE)

(73) Assignee: General Electric Company, Schenectady, NY (US)

( * ) Notice: Subject to any disclaimer, the term of this patent is extended or adjusted under 35 U.S.C. 154(b) by 285 days.

(21) Appl. No.: 14/731,102

(22) Filed: Jun. 4, 2015

(65) Prior Publication Data

US 2016/0357207 A1    Dec. 8, 2016

(51) Int. Cl.
*H02P 9/10* (2006.01)
*G05F 1/66* (2006.01)
*H02J 3/18* (2006.01)
*H02K 11/00* (2016.01)

(52) U.S. Cl.
CPC .................. *H02P 9/10* (2013.01); *G05F 1/66* (2013.01); *H02J 3/1885* (2013.01); *H02K 11/00* (2013.01)

(58) Field of Classification Search
CPC ... G05F 1/66; H02P 9/10; H02P 9/105; H02P 9/107; H02K 11/00; H02J 3/1885; Y02E 40/32
USPC .......................................................... 700/71
See application file for complete search history.

(56) References Cited

U.S. PATENT DOCUMENTS

| | | | | |
|---|---|---|---|---|
| 3,735,217 A | * | 5/1973 | Kilgore ................... | H02P 5/753 318/100 |
| 3,784,896 A | * | 1/1974 | Lakota ..................... | H02P 9/10 318/710 |
| 3,936,722 A | * | 2/1976 | Goto ...................... | H02J 3/1885 322/20 |
| 4,326,159 A | * | 4/1982 | Aotsu ....................... | H02P 9/10 322/19 |
| 4,740,738 A | * | 4/1988 | El-Antably ............. | H02P 3/065 318/701 |
| 5,483,147 A | * | 1/1996 | Ilic .......................... | H02P 9/102 290/52 |
| 5,604,420 A | * | 2/1997 | Nambu ................... | H02P 9/105 322/19 |
| 5,942,874 A | | 8/1999 | Vaananen et al. | |
| 6,121,744 A | * | 9/2000 | Hoda ....................... | H02P 8/18 318/671 |
| 6,368,075 B1 | * | 4/2002 | Fremerey ................ | F04D 3/00 310/90.5 |

(Continued)

FOREIGN PATENT DOCUMENTS

| | | | |
|---|---|---|---|
| EP | 0 887 921 | | 12/1998 |
| JP | 11113289 A | * | 4/1999 |

(Continued)

*Primary Examiner* — Crystal J Barnes-Bullock
(74) *Attorney, Agent, or Firm* — Nixon & Vanderhye P.C.

(57) ABSTRACT

A method keeps a synchronous machine in a stable operating zone during large transient voltage excursions on a power grid to which the machine is connected. The machine's load angle, i.e., the position of the rotor flux with respect to the position of the stator flux, is calculated. If the load angle is not within a defined range of reference values for stable machine operation, the machine's field excitation is adjusted to bring the machine's load angle within the defined range of reference values for stable machine operation.

20 Claims, 7 Drawing Sheets

(56) References Cited

U.S. PATENT DOCUMENTS

| | | | | |
|---|---|---|---|---|
| 8,736,090 B2* | 5/2014 | Riihimaki | ............... | H02P 9/04 290/40 R |
| 2005/0218741 A1* | 10/2005 | Wnorowski, Jr. | ....... | H02K 3/02 310/179 |
| 2013/0168960 A1* | 7/2013 | Kalinka | ............... | H02P 11/00 290/7 |
| 2015/0115997 A1* | 4/2015 | Gomez | ................... | H02P 9/10 324/764.01 |

FOREIGN PATENT DOCUMENTS

| JP | 11332291 A | * | 11/1999 |
|---|---|---|---|
| JP | 3187257 B2 | * | 7/2001 |

\* cited by examiner

DYNAMIC CALCULATION AND CONTROL OF SYNCHRONOUS MACHINES

BACKGROUND OF THE INVENTION

The present invention relates to synchronous machines, and more particularly to a method of keeping a synchronous machine within a stable operating zone during large transient voltage excursions.

Synchronous machines are rotating electromechanical machines that can be used as either motors or generators. Synchronous machines are commonly used as generators that are rotated by steam or gas turbines, so as to be used in power systems that are part of the power supply grid.

Synchronous machines have two mechanical parts, i.e., a rotor and a stator. They also have two electrical parts, i.e., a field source and an armature winding. The field source is typically located on the rotor of the machine, while the armature winding is typically located on the stator of the machine. The armature winding may be a three phase winding.

The field source produces a magnetic field with magnetic flux that interacts with the armature winding, so as to induce an AC (alternating current) voltage in the armature winding. The field source can be either permanent magnets or a field winding with DC (direct current) flowing through it. Permanent magnets are commonly used in small machines, while field windings are commonly used in large machines. A field winding produces a magnetic field as a result of the DC current flowing through it. The field excitation in the rotor field winding by the DC field current is constant in strength and rotates around the machine at the speed of rotation of the rotor by a prime mover. The magnitude of this field excitation and the magnetic field produced by it is directly proportional to the DC field current, as long as the magnetic circuit of the rotor and stator windings is not saturated.

When a synchronous machine operates as a generator, the machine's rotor is turned by external prime mover, such as a mechanical shaft driven by a gas or steam turbine. When the DC field current flows through the field winding rotating with the machine's rotor, the rotating field winding produces a rotating magnetic field. This rotating magnetic field induces AC voltage within the stator armature winding. When the AC voltage causes an AC current to begin to flow through the three phase armature winding, a magnetic field is then created that rotates at the same speed as the magnetic field created by current flowing through the rotating field winding on the rotor, which field is rotating at the synchronous speed of the machine. Thus, the rotating magnetic field created by the rotating field winding induces a three-phase voltage within the three-phase stator winding. The stator windings are the windings where the main electromotive force (EMF) or voltage in a generator is induced.

In a synchronous generator, "load angle" $\delta$ is defined as the angle between the electromotive force (EMF) induced in the generator (E) and the generator's terminal voltage (V). "Load angle" is also defined as the angle between the rotating magnetic field created by the rotor field winding and the rotating magnetic field induced by the stator armature. For a synchronous generator, the rotor magnetic field rotates at synchronous speed and the rotating magnetic field is created in the stator armature.

The two fields are not fully aligned. Typically, the rotor magnetic field lags the rotating stator field. This lagging is expressed in an angle that is the load angle. The load angle for a synchronous generator will vary as the generator moves from a no load condition to a load condition.

Power factor is defined as the cosine of the angle between current and voltage. Power factor is also the ratio of the real power delivered to a load to the apparent power delivered to the load. Apparent power is the product of RMS (root mean square) current and RMS voltage.

Load angle is important in maintaining the stability of a generator. If the load angle exceeds ninety degrees (90°), the generator becomes unstable. This may happen when a sudden change in a large load occurs or when a fault on the power grid is sustained for a long time. More recently, and in the future, an increase in the use of renewable energy sources may affect the ability of large synchronous machines connected to the power grid to stay synchronized during large voltage excursions. A synchronous generator operates in a lagging or unity power factor mode due to an inductive load. With growing renewable energy sources, the requirement to operate machines at leading power factors might increase to maintain system voltage, near nominal values.

The transient stability of a synchronous machine is largely defined by the operating point of the machine on its load angle curve. Power system stability depends on the clearing time for a fault on the transmission system. Slower fault clearing allows the rotor to accelerate so far along the power curve and could make a synchronous machine become de-synchronized. The ability of the machine to stay synchronized during a large transient is defined by the machine's operating load angle, i.e., the angle between the rotating magnetic field of the rotating rotor and the rotating magnetic field induced in the stator armature. The enhanced field excitation control feature of the present invention provides a control on machine load angle, with a capability to ensure minimum transient and dynamic stability margins.

BRIEF SUMMARY OF THE INVENTION

The present invention relates to a method for keeping a synchronous machine within a safe operating zone during large transient voltage excursions on a power grid to which the machine is connected.

In a first exemplary embodiment of the invention, a method for keeping a synchronous machine within a stable operating zone during large transient voltage or frequency excursions, the machine including an exciter comprises predefining a load angle range within which stable operation of the machine occurs, performing a load angle calculation for the machine, based on a generator terminal parameter, determining whether the calculated load angle is within the predefined stable operation load angle range for the machine, if the load angle is within the predefined stable operation load angle range, repeating the load angle calculation for the machine and the determination of whether the load angle is within the predefined stable operation load angle range until the load angle is no longer within the predefined stable operation load angle range, and if the load angle is not within the predefined stable operation load angle range, modifying the machine field excitation to bring the machine load angle back within the predefined stable operation load angle range, whereby the synchronous machine is kept within a safe operating zone during large transient excursions.

In another exemplary embodiment of the invention, a method for keeping a synchronous machine within a safe operating zone during large transient voltage or frequency excursions, the machine including an exciter comprises defining a load angle range within which a stable and synchronized operation of the machine occurs, having the exciter perform a load angle calculation for the machine, providing a load angle control that determines whether the load angle is within the predefined range within which stable and synchronized operation of the machine occurs, if the load angle is within the predefined range of set point values, having the exciter repeat performing the load angle calculation for the machine and having the load angle control determine whether the load angle is within the predefined range of values until the load angle is no longer within the predefined range of set point values, and if the load angle is not within the predefined range of set point values, having the machine exciter modify values at an automatic exciter set point (ASP_EX) that modulates an automatic voltage regulator set point (AVR SP), in predefined limits, so as to either increase or decrease machine field excitation, whereby the synchronous machine is kept within a safe operating zone during large transient voltage or frequency excursions.

In a further exemplary embodiment of the invention, a method for a synchronous machine within a safe operating zone during large transient voltage or frequency excursions on a power grid to which the machine is connected comprises using a human-machine-interface for controlling operation of the machine to define a load angle range within which a stable and synchronized operation of the machine occurs, having the exciter perform a load angle calculation for the machine, providing a load angle control that determines whether the load angle is within a predefined range of set point values stored in a machine exciter automatic set point block (EXASP), if the load angle is within the predefined range of set point values, having the exciter repeat performing the load angle calculation for the machine and the load angle control repeat determining whether the load angle is within the predefined range of values until the load angle is no longer within the predefined range of set point values, and if the load angle is not within the predefined range of set point values, having the machine exciter modify values at an automatic exciter set point (ASP_EX) that modulates an automatic voltage regulator set point (AVR SP), in predefined limits, so as to either increase or decrease machine field excitation, whereby the synchronous machine is kept within a safe operating zone during large transient voltage or frequency excursions.

DETAILED DESCRIPTION OF THE INVENTION

Figure 1:
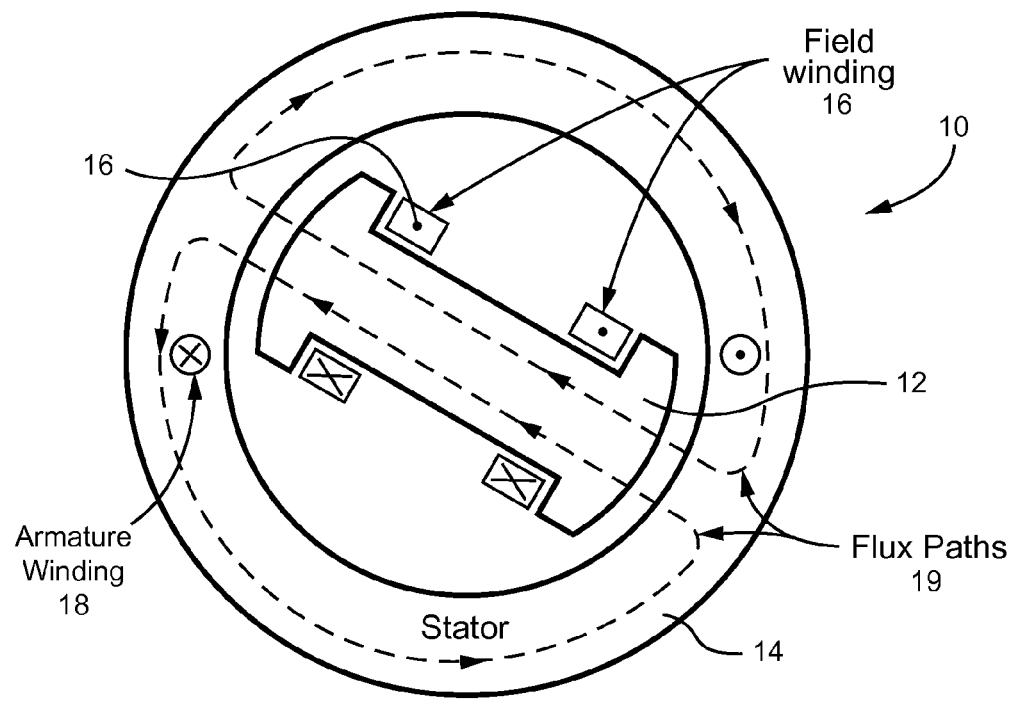
FIG. 1 is a plan schematic diagram of a simple synchronous generator.

Synchronous machines are commonly used as generators that are rotated by turbines, such as steam turbines, gas turbines, and by other types of engines such as internal combustion engines. Synchronous machines generate electricity delivered to customers over a country's power grid. The present invention relates to a method of determining whether the load angle of a synchronous machine is within predefined limits so as to keep the machine with in a stable and therefore safe operating zone, even during large transient voltage excursions on the power grid to which the machine is connected.

The ability of a synchronous machine to stay synchronized during a large voltage or frequency transient is defined by the machine's operating load angle, i.e., the angle between the rotating magnetic field of the rotating rotor and the rotating magnetic field induced in the stator armature. The method of the present invention mathematically calculates the machine's load angle, i.e., the position of the rotor flux with respect to the position of the stator flux, and enables the maintenance of the machine's load angle within a defined range of reference values for stable machine operation by adjusting the machine's field excitation.

Field excitation is maintained to attain greater machine operating stability, which enhances the reliable operation of gas and steam turbines connected to a synchronous generator on the power grid, even during large voltage or frequency excursions. The method of the present invention allows close monitoring of a machine's load angle so as to maintain stable machine operating conditions, irrespective whether the machine is in VAR or PF control. Importantly, this stability adds greater value to customer reliable operations, to thereby generate additional revenue.

Currently there are no direct methods of determining the load angle of a synchronous machine. It can only be mathematically calculated. The method of the present invention defines safe load angle operating boundaries based on a calculation of load angle to keep the machine with in a safe, stable operating zone, even during large transient excursions.

The ability of a synchronous machine to stay synchronized during large voltage or frequency transients is defined by the machine's operating load angle. The method of the present invention mathematically determines the position of machine rotor flux with respect to stator flux to keep the machine load angle within a determined range of reference values that are determined by the ability of the machine to operate in a stabile manner. The method of the present invention keeps the machine load angle within the determined range of reference values, by adjusting the machine field excitation, while ensuring that the machine is operating in a stabile manner. As the field excitation/strength is maintained to attain greater machine stability, this enhances the reliable operation of the gas or steam turbine driving the machine on the power grid. With growing requirements to operate synchronous machines at leading power factors, the enhanced field excitation control feature of the present invention provide a control of machine load angle, with a capability to ensure minimum transient and dynamic machine stability margins.

Figure 2:
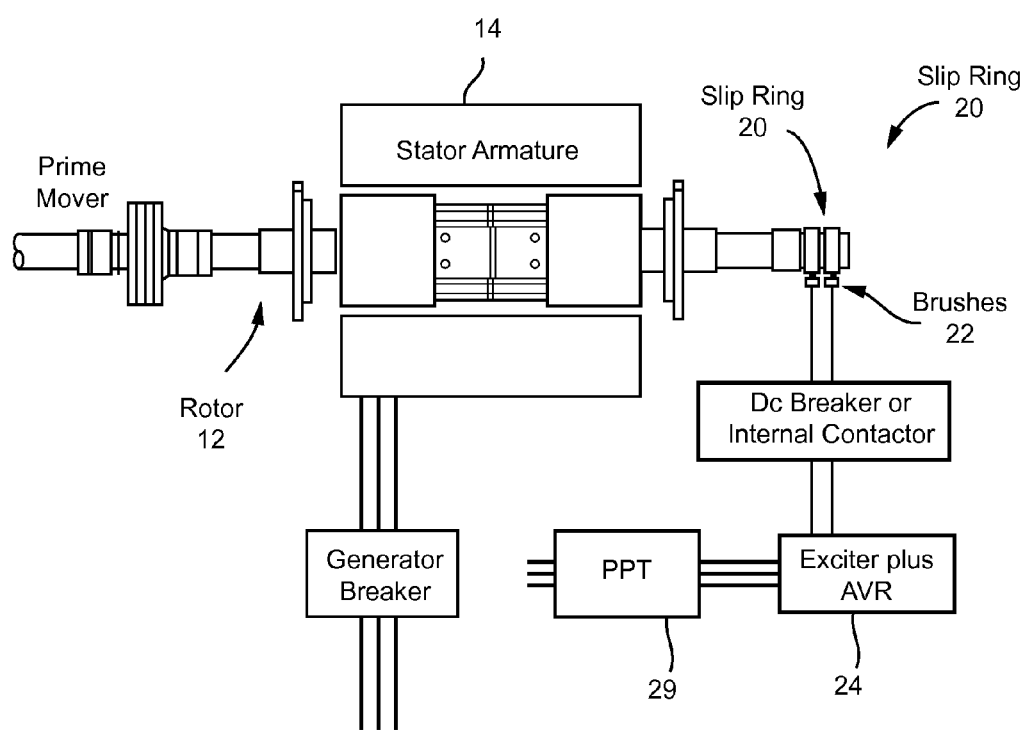
FIG. 2 is a side-elevational schematic diagram of a synchronous generator.

FIG. 1 is a plan schematic diagram of a simple synchronous generator 10 showing its rotor 12 and stator 14 and their corresponding windings. The windings include a field winding 16 located on the rotor 12 and an armature winding 18 located on the stator 14. The field winding 16 produces a magnetic field with magnetic flux 19 as a result of a DC current flowing through the field winding 16. FIG. 2 is a side-elevational schematic diagram of the synchronous generator 10 also showing the rotor 12 and stator 14 and slip rings 20 and brushes 22 by which DC current flows to the rotor 12.

When the magnetic flux 19 produced by the field winding 16 interacts with the armature winding 18, an AC voltage is induced in the armature winding 18. As the magnetic flux developed by the DC field winding crosses an air gap between the rotor and stator windings, a sinusoidal voltage is developed at the generator output terminals by means of a process is called electromagnetic induction.

The magnitude of the AC voltage generated is controlled by the amount of DC current supplied to the field winding 16. On large generators, exciters are used to produce the DC current that is used to control generator terminal voltage.

Figure 3:
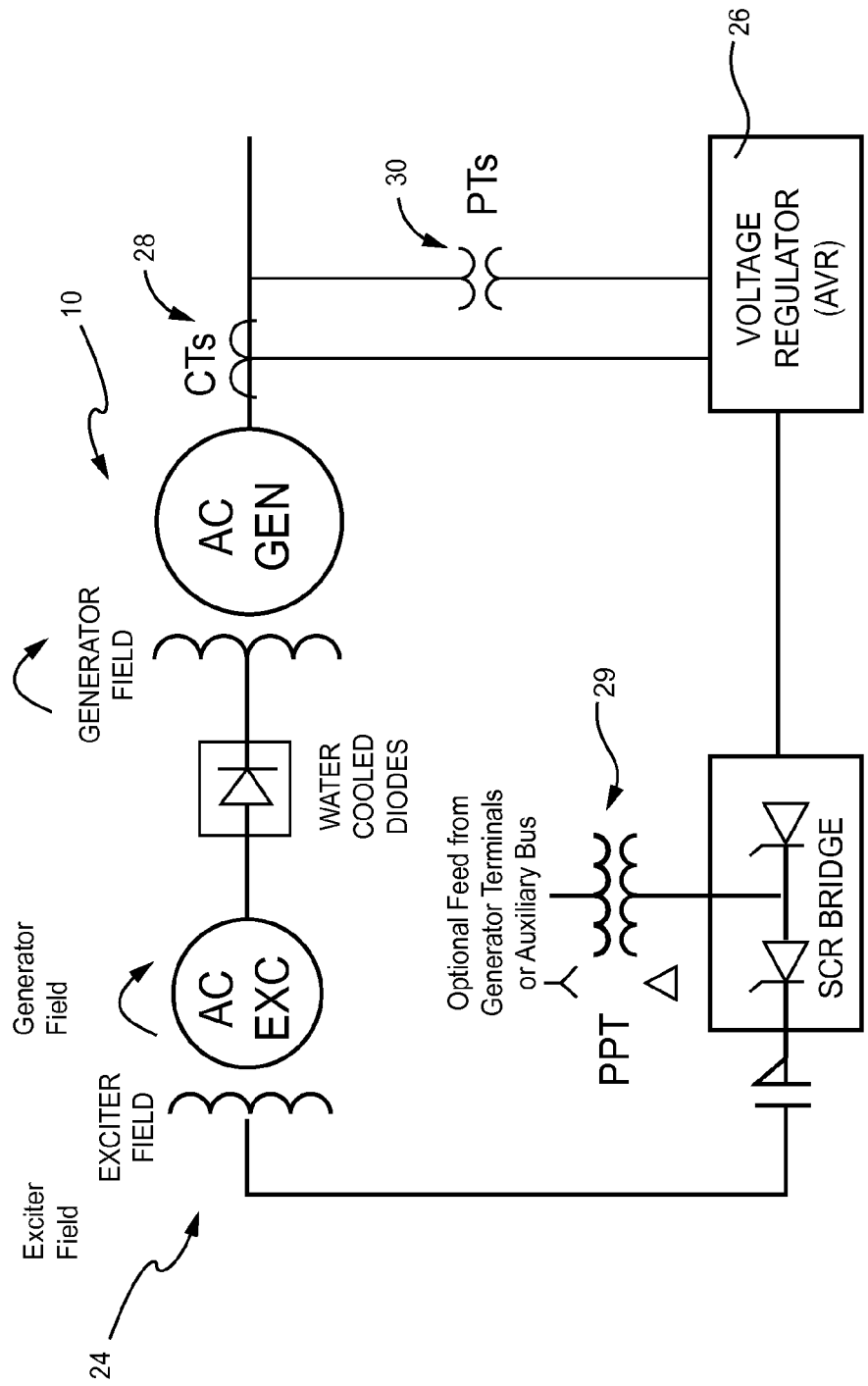
FIG. 3 is a schematic diagram of a generator excitation control, which includes an exciter circuit used to control generator field current and a voltage regulator used to regulate the magnitude of generator terminal voltage.

FIG. 3 is a schematic diagram showing a generator excitation control, which includes an exciter 24 used to control the generator field excitation and a voltage regulator 26 used to control the magnitude of the generator terminal voltage. Current transformers (CTs) 28 monitor the stator current, while potential transformers (PTs) 30 monitor the generator terminal voltage. With the Power Potential Transformer (PPT) regulator 29, the excitation control can desensitize the effect of the exciter time constant by incorporating direct measurement of the generator field voltage and field current to enhance speed of response to system transients.

A "phasor" is a scaled line called a "vector" whose length represents an AC quantity that has both magnitude ("peak amplitude") and direction ("phase") at some fixed point in time. In a rotating synchronous generator, a phasor diagram of rotating vectors are typically shown in the rotating synchronous dq frame of the rotor of the generator. In the rotating synchronous dq frame, the axis of the field winding in the direction of the DC field is called the rotor direct axis or the d-axis. Ninety (90) degrees later than the d-axis is the quadrature axis or the q-axis. As a phasor diagram can be drawn to represent any instant of time and therefore any angle, the reference phasor or vector of an alternating quantity is drawn along the horizontal axis of the phasor diagram. All vectors are drawn rotating in an anticlockwise direction. All vectors ahead of the reference vectors are said to be "leading" while all the vectors behind the reference vector are said to be "lagging".

Figure 4:
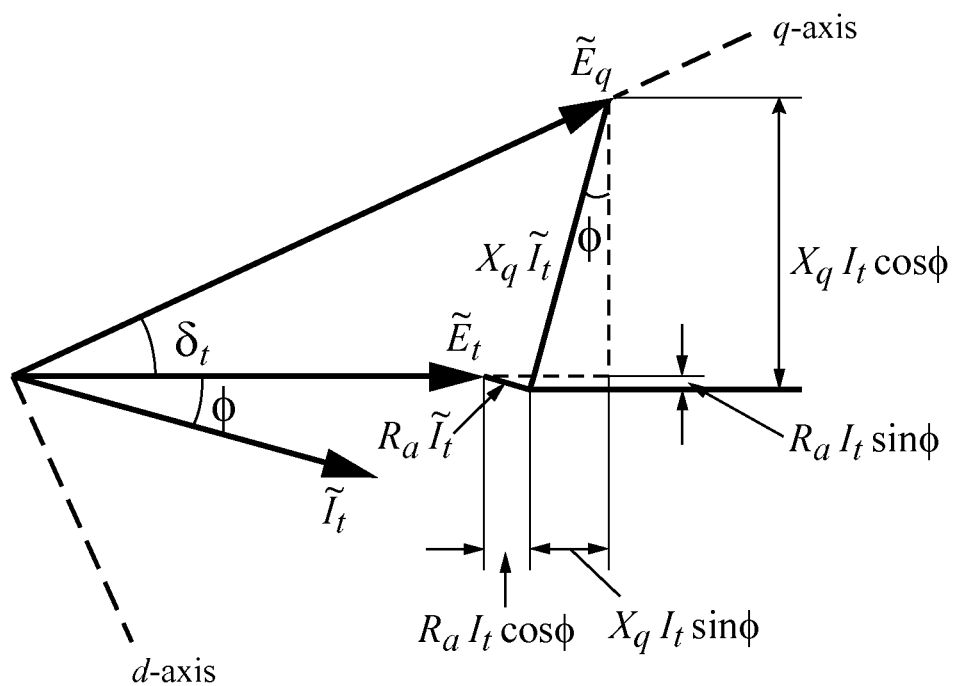
FIG. 4 is a phasor diagram for a synchronous generator operating in a lagging power factor mode due to an inductive load.

FIG. 4 is a phasor diagram for a synchronous generator operating in a lagging power factor mode due to an inductive load. The terminal voltage $Ě_t$ is drawn along the horizontal axis of the phasor diagram, and thus, it is the reference vector in the phasor diagram of FIG. 3. The terminal current $Ǐ_t$ is shown in FIG. 3 as lagging the terminal voltage $Ě_t$ by an angle $\phi$, which is the difference in phase, i.e., the phase angle, between the terminal voltage $E_t$ and the terminal current $Ǐ_t$.

The internal voltage induced in the generator stator winding $Ě_q$ is produced by the rotor magnetic field interacting with the stator winding. Typically, the internally induced voltage in a synchronous generator $Ě_q$ is not the voltage $Ě_t$ appearing at the generator's terminals because the internally induced generator voltage will equal the generator's terminal voltage only when there is no armature current in the machine. Thus, the load angle $\delta_i$ is the angle between the internal voltage $Ě_q$ and the terminal voltage $Ě_t$.

"Power factor" is defined as the cosine of the phase angle $\phi$ (cos $\phi$) between the terminal voltage $E_t$ and the terminal current $Ǐ_t$. The phase angle $\phi$ can range between −90° and +90°, so as to be denoted as being leading or lagging. A lagging power factor exists when the current lags the voltage. In the context of the power generation it means that the generator injects reactive power into the power grid. A leading power factor: exists when the current leads the voltage. This means that the generator absorbs reactive power from the power grid.

Inductive loads, such as motors, have lagging power factors, such that industrial facilities tend to have a "lagging power factor", because of large numbers of electric induction motors, the windings of which act as inductors as seen by the power supply.

The mathematical equation for calculating the load angle of a synchronous machine operating in a lagging power factor mode whose phasor diagram is shown in FIG. 3 is as follows:

$$\delta_i = \tan^{-1}\left(\frac{X_q I_t \cos\phi - R_a I_t \sin\phi}{E_t + R_a I_t \cos\phi + X_q I_t \sin\phi}\right)$$

where $X_q$ is the stator armature reactance, and $R_a$ is the stator armature resistance. As such, the product $X_q Ǐ_t$ defines the drop in the internal induced voltage $Ě_q$ in the generator stator winding due to the stator reactance, while the product $R_a Ǐ_t$ defines the drop in the internal induced voltage $Ě_q$ in the generator stator winding due to the stator resistance.

The load angle $\delta_i$ is the inverse of the tangent of such angle, which is equal to the side of the triangle shown in the phasor diagram of FIG. 4 opposite to the load angle $\delta_i$ divided by the side of the triangle shown in the phasor diagram of FIG. 4 adjacent to load angle $\delta_i$. In can be seen from the phasor diagram of FIG. 4 that the side of the triangle opposite to the load angle $\delta_i$ is defined as $X_q Ǐ_t \cos \phi$ minus $R_a Ǐ_t \sin \phi$. Likewise, in can also be seen from the phasor diagram of FIG. 4 that the side of the triangle adjacent to the load angle $\delta_i$ is defined as the terminal voltage $Ě_t$ plus $R_a Ǐ_t \cos \phi$ plus $X_q Ǐ_t \sin \phi$.

Figure 5:
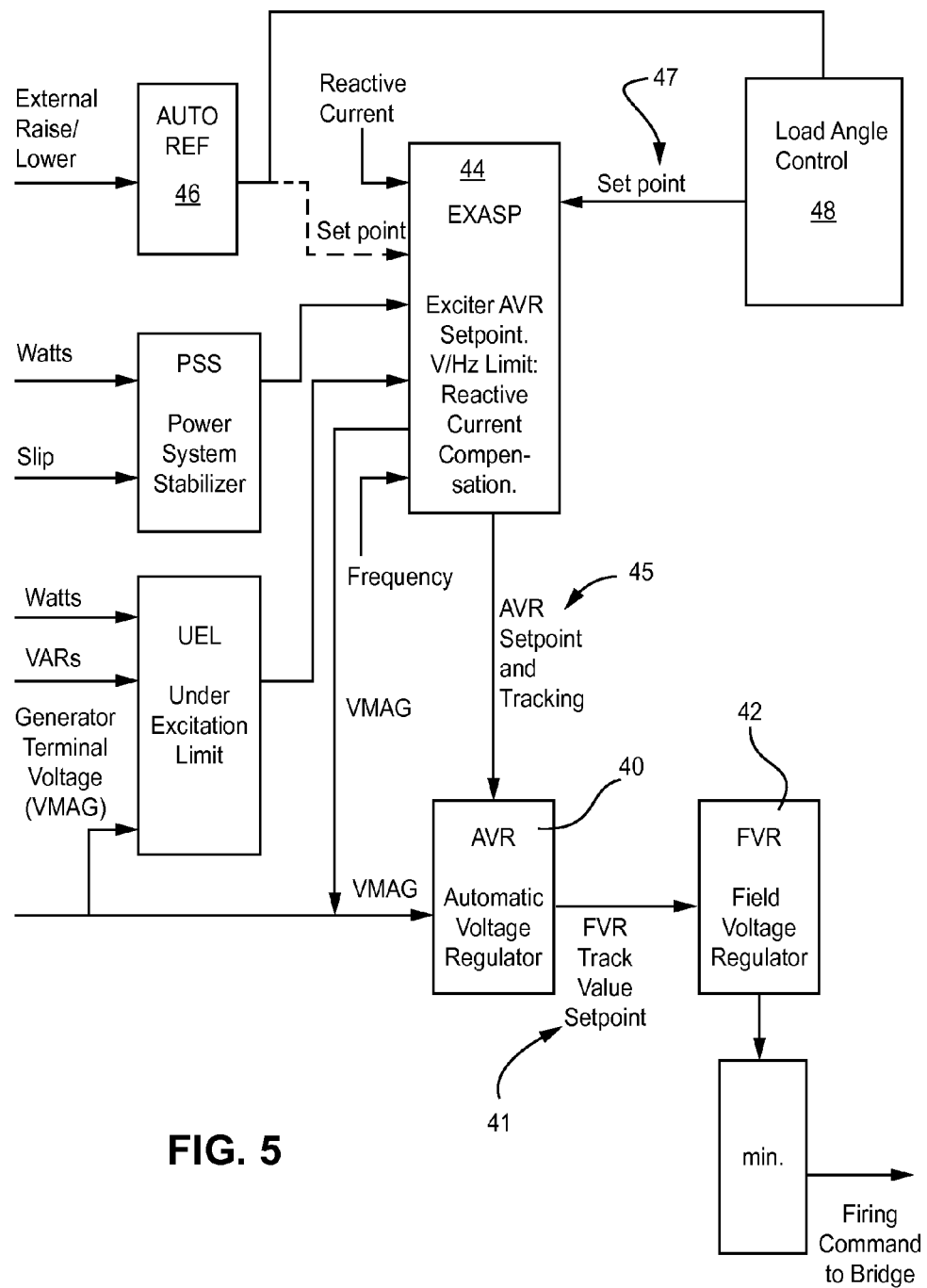
FIG. 5 is a block diagram of the circuitry comprising a generator excitation control.

FIG. 5 is a block diagram of control system comprising an excitation control for generator 10. The excitation control includes an Automatic Voltage Regulator (AVR) 40, which maintains the generator terminal voltage constant over changes in load and operating conditions. AVR 40 produces an FVR Track Value Setpoint input 41 to a Field Voltage Regulator (FVR) 42, which controls the generator field voltage. FVR 42 is a manual regulator which uses the generator field voltage 43 as a feedback input. An Automatic Voltage Regulator Setpoint Block (EXASP) 44 combines a number of functions to produce a reference input (AVR setpoint and tracking value) 45 to the AVR 40. The AVR setpoint is combined with other auxiliary stabilizing and protective signals in the EXASP block 44 to form the reference 45 to the AVR 40. An Auto Regulator Reference (AUTO REF) block 46, which receives external operator commands, such as raise and lower inputs, from direct inputs or over a data link from a human machine interface (HMI) operator station, generates an auto control (AC) setpoint variable for the EXASP 44. However, according to the present invention, the setpoint input to the EXASP block from the AUTO REF 46 is routed through the Load Angle Control 48, which modifies (or not) the setpoint input 47 to the EXASP 44 based on a calculation of a load angle for the machine 10 using the load angle calculating mathematical equation set forth above and on a determination of whether the calculated load angle is within the defined synchronized operation load angle range for the machine 10. The modified (or not) setpoint values 47 are input to a machine automatic voltage regulator summing junction 49 through an additional input 50 shown in FIG. 6, whereby the machine field excitation is either increased or decreased. The components, such as 40, 42, 44, 46 and 48, of the excitation control may implemented using one or more processors executing instructions stored on a non-transitory memory device.

Figure 6:
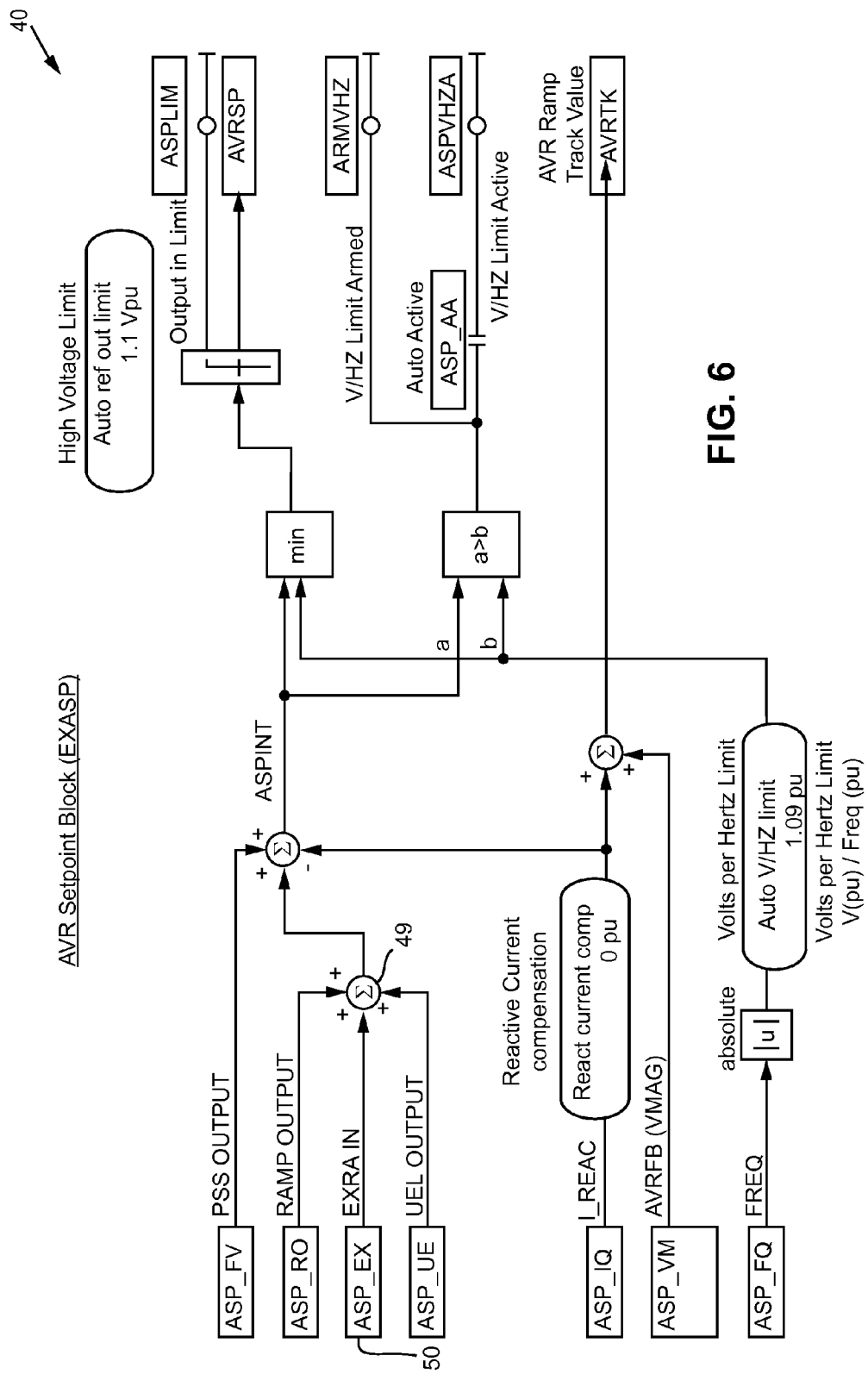
FIG. 6 is a more detailed block diagram of the Automatic Voltage Regulator Setpoint Block (EXASP) of FIG. 5.

FIG. 6 is a more detailed block diagram of the Automatic Voltage Regulator Setpoint Block (EXASP) 44 of FIG. 5 showing the summing junction 49 and the modified (or not) setpoint values ASP_EX input 50 to the summing junction 49.

Figure 7:
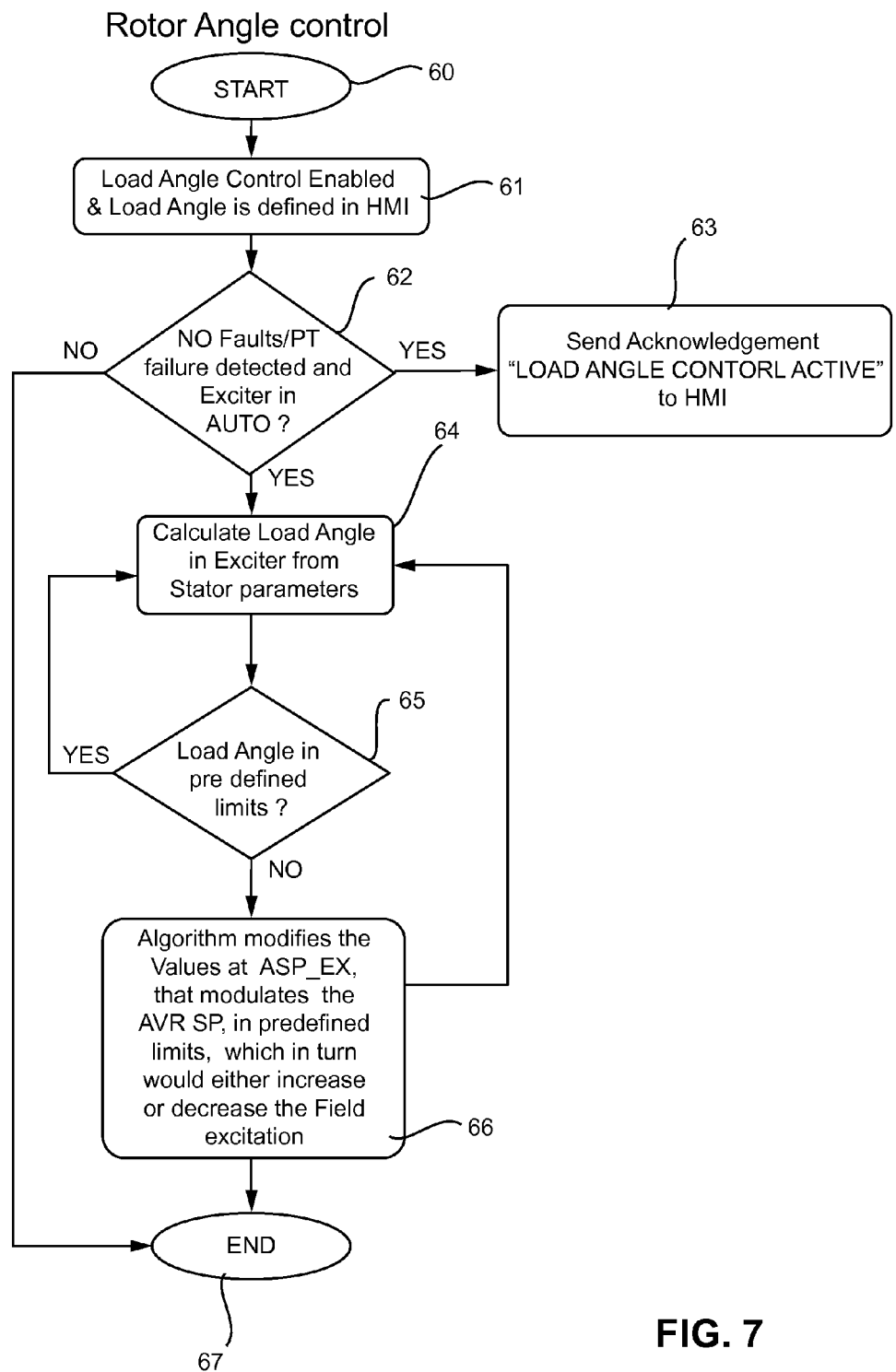
FIG. 7 is a flowchart of the steps of the method of the present invention for keeping a synchronous machine within a safe operating zone during large transient voltage excursions.

FIG. 7 is a flowchart 60 for a rotor angle control algorithm which depicts the steps of a method for keeping a synchronous machine within a safe operating zone during large transient voltage excursions. For the machine to stay synchronized during a large voltage or frequency transient, the machine's operating load angle, i.e., the angle between the rotating magnetic field of the rotating rotor and the rotating magnetic field induced in the stator armature, is calculated. After the machine's load angle is calculated, a determination is made as to whether the load angle is within a defined range of load angle values for stable machine operation. If it is not, the load angle is modified by adjusting the field excitation to ensure that the machine's operation is within its capability to operate in a stable manner. The defined range of load angle values for stable machine operation may be in a range of zero to ninety degrees (0° and 90°).

Turning to the flowchart of FIG. 7, from the start step 60, the next step 61 is enabling the Load Angle Control and then predefining the load angle range for stable operation of the generator 10. These steps are performed through an HMI that is used by the operator of the generator to control its operation. At step 62, if machine faults or PT failures are not detected and the exciter 24 is in an automatic (AUTO) mode of operation, an Acknowledgement that "LOAD ANGLE CONTORL ACTIVE" is sent to the HMI at step 63. Also, if at step 62 no machine faults or PT failures are detected and the exciter is in the AUTO mode, at step 64, a load angle calculation is made in the Exciter 24 from the stator parameters defined with respect to the mathematical equation set forth above for calculating the load angle of a synchronous machine operating in a lagging power factor mode. The load angle calculation may be performed in the load angle control 48. The load angle control may also include the control of the exciter.

If at step 62, a machine fault or PT failure is detected or if the exciter is not in AUTO mode, the rotor control algorithm is terminated at step 67.

At step 65, a determination is made in the load angle control 48 as to whether the machine load angle $\delta_i$ is within the predefined range of values. If it is, then the step 64 of calculating the load angle is repeated, and the loop containing this step is repeated unless and until the load angle is no longer within the predefined range of load angle values. If at step 65 a determination is made that the load angle is not within the predefined range of load angle values, then at step 66 the load angle control 48 modifies the values at ASP_EX 50 that modulate the AVR setpoint, such that load angle is maintained in predefined limits, for which, control system would either increases or decreases the machine field excitation. The modification of the values at ASP_EX is an additional input to the AVR summing junction 49. In addition, when the modulation of the AVR setpoint occurs, the External RAISE/LOWER commands that would be used might be inhibited in an application SW, if the operating point hits the boundaries of the predefined range of load angle values. In any event, after step 66 of the load angle control modifies the values at ASP_EX has been performed, the step 65 of determining whether the load angle is within a predefined range of values is repeated by the load angle control 48. Thereafter, the next step is End 67.

Thus, the method of the present invention mathematically calculates a machine's load angle, that is, the position of the rotor flux with respect to the position of the stator flux and enables the maintenance of the load angle within a defined range of reference values for stable machine operation by adjusting the machine's field excitation.

Field strength is maintained to attain greater machine operating stability, which enhances the reliable operation of gas and steam turbines connected to a synchronous generator on the power grid, even during large voltage or frequency excursions. The method of the present invention allows close monitoring of a machine's load angle so as to maintain stable machine operating conditions, irrespective whether the machine is in VAR or PF control. Importantly, this stability adds greater value to customer reliable operations, to thereby generate additional revenue.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of operating a synchronous machine within a stable operating zone during large transient voltage or frequency excursions, the machine including an exciter, the method comprising:
predefining a stable operation load angle range within which a stable operation of the machine occurs;
performing a load angle calculation for the machine;
determining whether the calculated load angle is within the predefined stable operation load angle range for the machine;
if the load angle is within the predefined stable operation load angle range, repeating the load angle calculation for the machine and the determination of whether the load angle is within the predefined stable operation load angle range until the load angle is no longer within the predefined stable operation load angle range;
if the load angle is not within the predefined stable operation load angle range, modifying the machine field excitation to bring the machine load angle back within the predefined stable operation load angle range; and
after the machine field excitation is modified, operating the synchronous machine while the load angle is within a safe operating zone during large transient voltage excursions.

2. The method of claim 1, wherein the step of performing the load angle calculation for the machine is performed in the exciter.

3. The method of claim 1, wherein the predefined stable operation load angle range is defined via a human machine interface for controlling operation of the machine.

4. The method of claim 1, wherein the step of changing the machine field excitation is performed by modifying the predefined stable operation load angle range, and inputting the modified predefined stable operation load angle range into a machine exciter automatic voltage regulator to change the machine field excitation.

5. The method of claim 1, wherein the step of determining whether the machine load angle is within the predefined stable operation load angle range is performed by providing a load angle control that determines whether the load angle is within the predefined stable operation load angle range.

6. The method of claim 1, wherein the predefined stable operation load angle range is stored in a machine exciter automatic set point block that is part of a machine excitation control.

7. The method of claim 1, wherein the step of modifying the machine field excitation is performed by modifying a machine field current.

8. The method of claim 1, wherein the predefined stable operation load range for stable machine operation is between zero and 90 degrees.

9. The method of claim 1, wherein the synchronous machine is operating as a generator, or a synchronous condenser or motor.

10. A method of operating a synchronous machine within a safe operating zone during large transient voltage or frequency excursions, the machine including an exciter, the method comprising:
    predefining a load angle range within which a stable and synchronized operation of the machine occurs;
    having the exciter perform a load angle calculation for the machine;
    providing a load angle control that determines whether the load angle is within the predefined load angle range within which the stable and synchronized operation of the machine occurs;
    if the load angle is within the predefined load angle range, having the exciter repeat performing the load angle calculation for the machine and having the load angle control determine whether the load angle is within the predefined load angle range until the load angle is no longer within the predefined load angle range;
    if the load angle is not within the predefined load angle range, having the machine exciter modify values at an automatic exciter set point block that modulates an automatic voltage regulator set point, in predefined limits, so as to either increase or decrease machine field excitation; and
    after the machine field excitation is modified, operating the synchronous machine while the load angle is within a safe operating zone during large transient voltage or frequency excursions.

11. The method of claim 10, wherein the predefined load angle range is defined via a human machine interface for controlling operation of the machine.

12. The method of claim 10, wherein the automatic exciter set point block is part of a machine excitation control.

13. The method of claim 10, wherein the step of modifying the machine field excitation is performed by modifying a machine field current or voltage.

14. The method of claim 10, wherein the predefined load angle range for stable machine operation is between zero and ninety degrees.

15. The method of claim 10, wherein the synchronous machine is operating as a generator.

16. A method of operating a synchronous machine within a safe operating zone during large transient voltage or frequency excursions on a power grid to which the machine is connected, the machine including an exciter, the method comprising:
    using a human-machine-interface for controlling operation of the machine to define a load angle range within which a stable and synchronized operation of the machine occurs;
    having the exciter perform a load angle calculation for the machine;
    providing a load angle control that determines whether the load angle is within a predefined range of set point values stored in a machine exciter automatic set point block;
    if the load angle is within the predefined range of set point values, having the exciter repeat performing the load angle calculation for the machine and the load angle control repeat determining whether the load angle is within the predefined range of set point values until the load angle is no longer within the predefined range of set point values;
    if the load angle is not within the predefined range of set point values, having the machine exciter modify values at an automatic exciter set point that modulates an automatic voltage regulator set point, in predefined limits, so as to either increase or decrease machine field excitation; and
    after the machine field excitation is modified, operating the synchronous machine while the load angle is within a safe operating zone during large transient voltage or frequency excursions.

17. The method of claim 16, wherein the machine exciter automatic set point block is part of a machine excitation control.

18. The method of claim 16, wherein the step of modifying the machine field excitation is performed by modifying a machine field current or voltage.

19. The method of claim 16, wherein the defined load angle range for the stable and synchronized machine operation is between 0° and 90°.

20. The method of claim 16, wherein the synchronous machine is operating as a generator or motor.

* * * * *

UNITED STATES PATENT AND TRADEMARK OFFICE
CERTIFICATE OF CORRECTION

PATENT NO. : 9,906,176 B2
APPLICATION NO. : 14/731102
DATED : February 27, 2018
INVENTOR(S) : Sreedhar Desabhatla It is certified that error appears in the above-identified patent and that said Letters Patent is hereby corrected as shown below:

In the Specification

Column 7, Line 29, replace "Load Angle Control" with --Load Angle Control 48--

Signed and Sealed this
First Day of May, 2018

Andrei Iancu
*Director of the United States Patent and Trademark Office*